United States Patent
Sugasawa et al.

(10) Patent No.: US 8,699,155 B2
(45) Date of Patent: Apr. 15, 2014

(54) LENS MECHANISM AND IMAGING DEVICE

(75) Inventors: Masayuki Sugasawa, Chiba (JP); Nobuyuki Nagai, Kanagawa (JP); Kazuomi Murakami, Aichi (JP)

(73) Assignee: Sony Corporation, Tokyo (JP)

( * ) Notice: Subject to any disclaimer, the term of this patent is extended or adjusted under 35 U.S.C. 154(b) by 209 days.

(21) Appl. No.: 12/768,291

(22) Filed: Apr. 27, 2010

(65) Prior Publication Data

US 2010/0296175 A1 Nov. 25, 2010

(30) Foreign Application Priority Data

May 22, 2009 (JP) ................ P2009-124368

(51) Int. Cl.
*G02B 7/08* (2006.01)
*G02B 7/10* (2006.01)

(52) U.S. Cl.
CPC ... *G02B 7/08* (2013.01); *G02B 7/10* (2013.01)
USPC .......................................... 359/824; 359/700

(58) Field of Classification Search
CPC .................................... G02B 7/08; G02B 7/10
USPC .............................. 359/824, 700; 310/323.06
See application file for complete search history.

(56) References Cited

U.S. PATENT DOCUMENTS

| 4,755,705 | A * | 7/1988 | Holum ........................... 310/328 |
| 6,853,507 | B2 * | 2/2005 | Ryu et al. ....................... 359/824 |
| 7,068,930 | B2 * | 6/2006 | McKevitt et al. ............... 396/79 |
| 7,582,009 | B1 | 9/2009 | Cole |

FOREIGN PATENT DOCUMENTS

| JP | 2000-137155 | 5/2000 |
| JP | 2006-293007 | 10/2006 |
| JP | 2007-034070 | 2/2007 |
| JP | 2007-151221 | 6/2007 |
| JP | 2007-163662 | 6/2007 |
| JP | 2007-143300 | 7/2007 |
| JP | 2009-092819 | 4/2009 |

OTHER PUBLICATIONS

Kim, Dae S., Ho B. Park, Young M. Lee, Young H. Park, and Ji-Won Rhim. "Preparation and Characterization of PVDF/Silica Hybrid Membranes Containing Sulfonic Acid Groups." Journal of Applied Polymer Science 93.1 (2004): 209-218.*
Japanese Office Action issued Dec. 25, 2012 in corresponding Japanese Patent Application No. 2009-124368.
Japanese Office Action issued Aug. 21, 2013 in corresponding Japanese Patent Application No. 2009-124368.

* cited by examiner

*Primary Examiner* — Zachary Wilkes
(74) *Attorney, Agent, or Firm* — K&L Gates LLP

(57) ABSTRACT

Disclosed herein is a lens mechanism including: a base; a guide member fixed to the base; a lens holding member adapted to hold the lens and which is held by the guide member in such a manner as to move straight along the optical axis; a rotary member adapted to rotate while at the same time engaging with part of the lens holding member so as to cause the lens holding member to move straight along the optical axis; and polymer actuator elements each of which has one end fixed to the base or guide member and the other end engaging with part of the rotary member so as to rotate the rotary member in a plane orthogonal to the optical axis.

6 Claims, 5 Drawing Sheets

F I G . 2
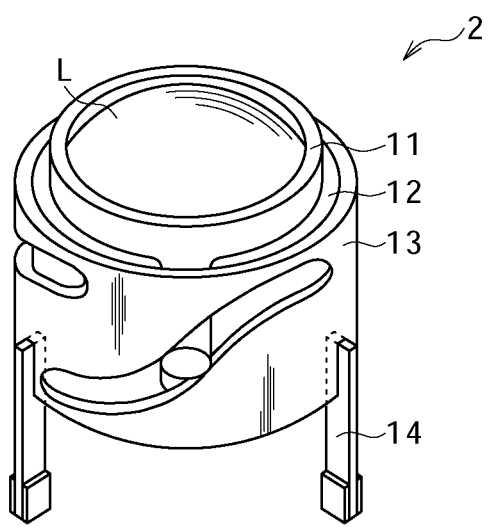

F I G . 6 A
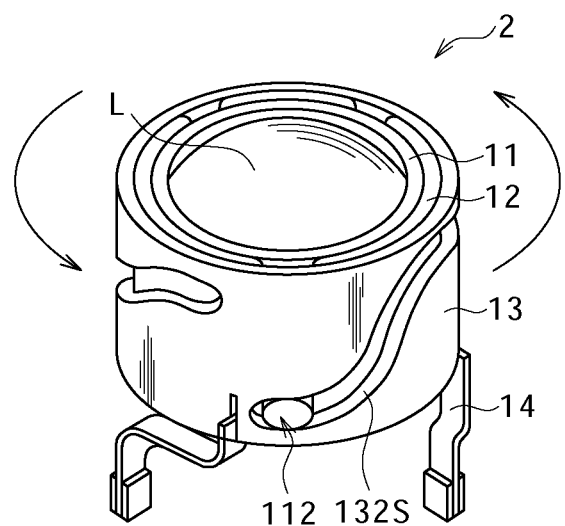
F I G . 6 B
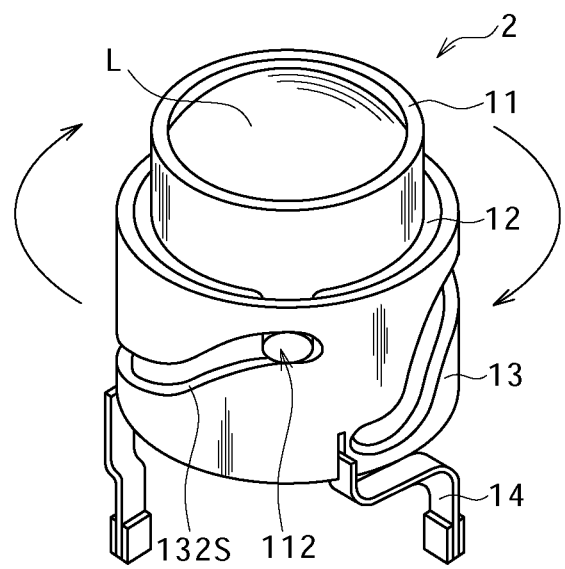

LENS MECHANISM AND IMAGING DEVICE

CROSS REFERENCES TO RELATED APPLICATIONS

The present application claims priority to that disclosed in Japanese Priority Patent Application JP 2009-124368 filed with the Japan Patent Office on May 22, 2009, the entire content of which is hereby incorporated by reference.

BACKGROUND

The present application relates to a lens mechanism having polymer actuator elements and an imaging device having the same.

Recent years have seen remarkable advances of portable electronic devices including personal computers and PDAs in terms of performance. Commonly, such devices offer imaging capability thanks to a lens mechanism which incorporates a lens unit. In such devices, the lens unit of the lens mechanism moves along the optical axis as a movable section to achieve focusing and zooming.

Voice coil motor and stepping motor have been popular for use as a drive section to move the lens unit. Recently, however, lens mechanisms have come along which use a polymer actuator element as a drive section for more compact size (refer, for example, to Japanese Patent Laid-Open No. 2006-293007 (Patent Document 1, hereinafter) and Japanese Patent Laid-Open No. 2007-151221 (Patent Document 2, hereinafter)). A polymer actuator element includes, for example, an ion exchange resin sandwiched between a pair of electrodes. Such a polymer actuator element is displaced in a direction orthogonal to the surface of the ion exchange resin film as a result of the development of a potential difference between the pair of electrodes.

SUMMARY

In the lens mechanisms disclosed in Patent Documents 1 and 2, however, the lens unit and polymer actuator element are arranged side by side along the optical axis so that the polymer actuator element applies a driving force to the lens unit along the optical axis. This leads to a difference in load applied to the polymer actuator element by the weight of the lens unit depending on the attitude of the lens mechanism. For example, if the lens mechanism is in such an attitude that the optical axis is vertical (attitude in which the polymer actuator element and lens unit are vertically side by side), a relatively small driving force is required to move the lens unit downward. However, a large driving force is required to move the same unit upward due to the weight of the lens unit. In contrast, if the lens mechanism is in such an attitude that the optical axis is horizontal (attitude in which the polymer actuator element and lens unit are horizontally side by side), the weight of the lens unit does not affect the driving force irrespective of in which of the two directions the lens unit is moved along the optical axis.

For this reason, the driving force applied by the polymer actuator element must be controlled according to the attitude of the lens mechanism to provide the same amount of travel in any attitude. However, providing such a control mechanism runs counter to size reduction, making it unrealistic. On the other hand, failure to control the driving force according to the attitude leads to a discrepancy in amount of travel of the lens unit for a given driving force depending on the attitude of the lens mechanism. This makes accurate focusing and zooming difficult, thus resulting in insufficient optical performance. Therefore, a lens mechanism is sought after which can move the lens unit with high accuracy despite having a simple configuration and irrespective of the attitude thereof.

In light of the foregoing, a lens mechanism capable of moving its lens with high accuracy despite having a simple configuration and irrespective of the attitude thereof is provided according to an embodiment. Further, an imaging device having the above lens mechanism which can deliver excellent imaging performance is provided according to an embodiment.

The lens mechanism according to an embodiment has the following components:

(A) Base;

(B) Guide member fixed to the base;

(C) Lens holding member adapted to hold the lens and which is held by the guide member in such a manner as to move straight along the optical axis;

(D) Rotary member adapted to rotate while at the same time engaging with part of the lens holding member so as to cause the lens holding member to move straight along the optical axis; and (E) Polymer actuator elements each of which has one end fixed to the base or guide member and the other end engaging with part of the rotary member so as to rotate the rotary member in a plane orthogonal to the optical axis.

The imaging device according to the embodiment includes an enclosure and the above lens mechanism according to the embodiment of the present application.

In the lens mechanism and imaging device according to the embodiment, the polymer actuator elements rotate the rotary member, adapted to cause the lens holding member to move straight along the optical axis, in a plane orthogonal to the optical axis. This makes it unlikely that the load, applied to the polymer actuator element when the rotary member is rotated, may change depending on the attitude of the lens mechanism.

In the lens mechanism according to the embodiment, a driving force is applied by the polymer actuator element to the rotary member in a direction orthogonal to the optical axis. This makes it possible to move the lens holding member to a given position along the optical axis with accuracy irrespective of the attitude of the lens mechanism.

The imaging device according to the embodiment includes the above lens mechanism, thus allowing for more accurate focusing and zooming and delivering excellent optical performance.

Additional features and advantages are described herein, and will be apparent from the following Detailed Description and the figures.

BRIEF DESCRIPTION OF THE FIGURES

FIG. 2 is a perspective view illustrating the overall configuration of a lens mechanism shown in FIG. 1;

FIGS. 6A and 6B are perspective views for describing the operation of the lens mechanism shown in FIG. 1.

DETAILED DESCRIPTION

The present application with reference to the accompanying drawings will be described below according to an embodiment.

Configuration of the Imaging Device

First, a description will be given of an imaging device having a lens mechanism as an embodiment with reference to FIG. 1.

Figure 1:
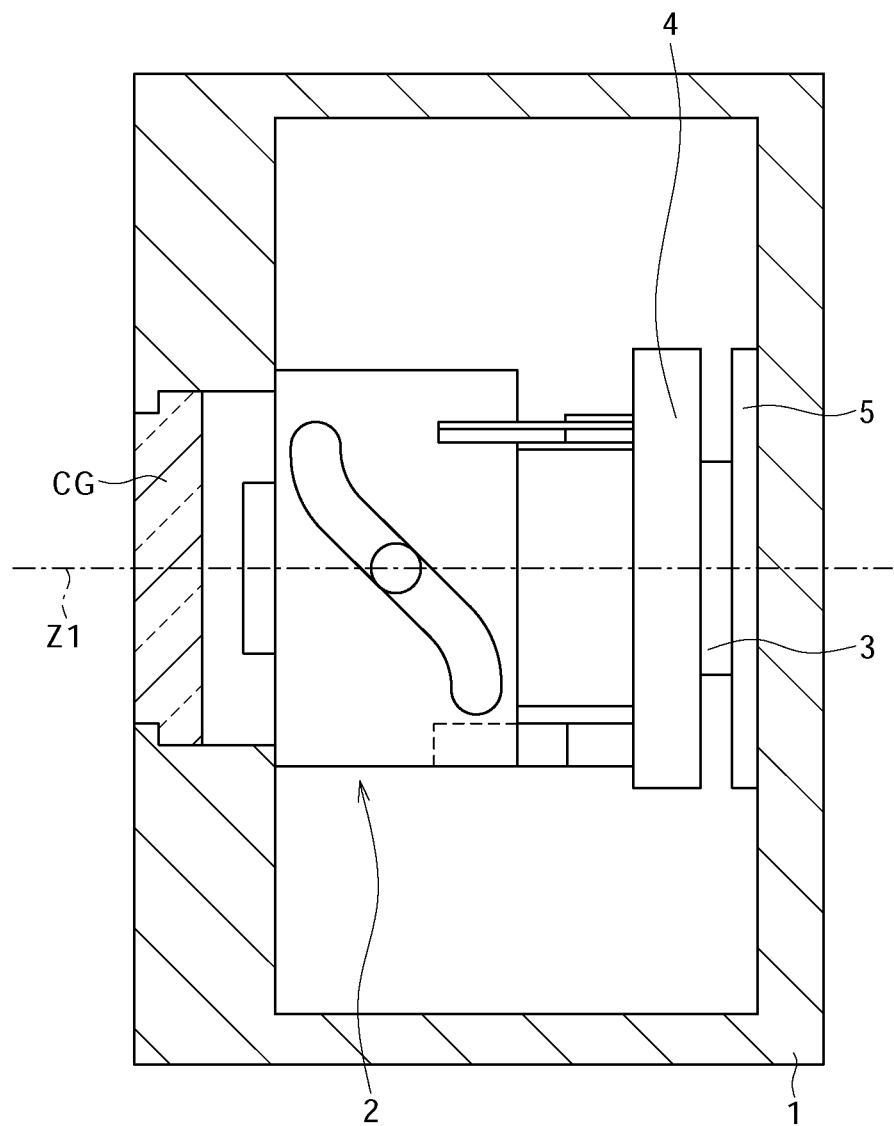
FIG. 1 is a diagrammatic sketch illustrating the overall configuration of an imaging device as an embodiment.

FIG. 1 is a diagrammatic sketch illustrating the overall configuration of the imaging device according to an embodiment. This imaging device corresponds to a portable electronic device such as a compact still camera or mobile phone with imaging capability. It should be noted that the object side as seen from a given target (left side of the page in FIG. 1) will be referred to as the front side, and the image side (right side of the page in FIG. 1) as the rear side in the present specification. This imaging device includes a lens mechanism 2 and imaging element 3 in an enclosure 1. The lens mechanism 2 and imaging element 3 are arranged in order from the object side.

The lens mechanism 2 and imaging element 3 are fixed to a support substrate 4 provided therebetween. Further, the imaging element 3 is fixed to a circuit substrate 5 on the opposite side of the support substrate 4. On the other hand, a cover glass CG is fitted in the enclosure 1 on the object side of the lens mechanism 2 along an optical axis Z1. An image sensor incorporating a CCD (Charge Coupled Device) or CMOS (Complementary Metal Oxide Semiconductor) can be used, for example, as the imaging element 3.

Figure 3:
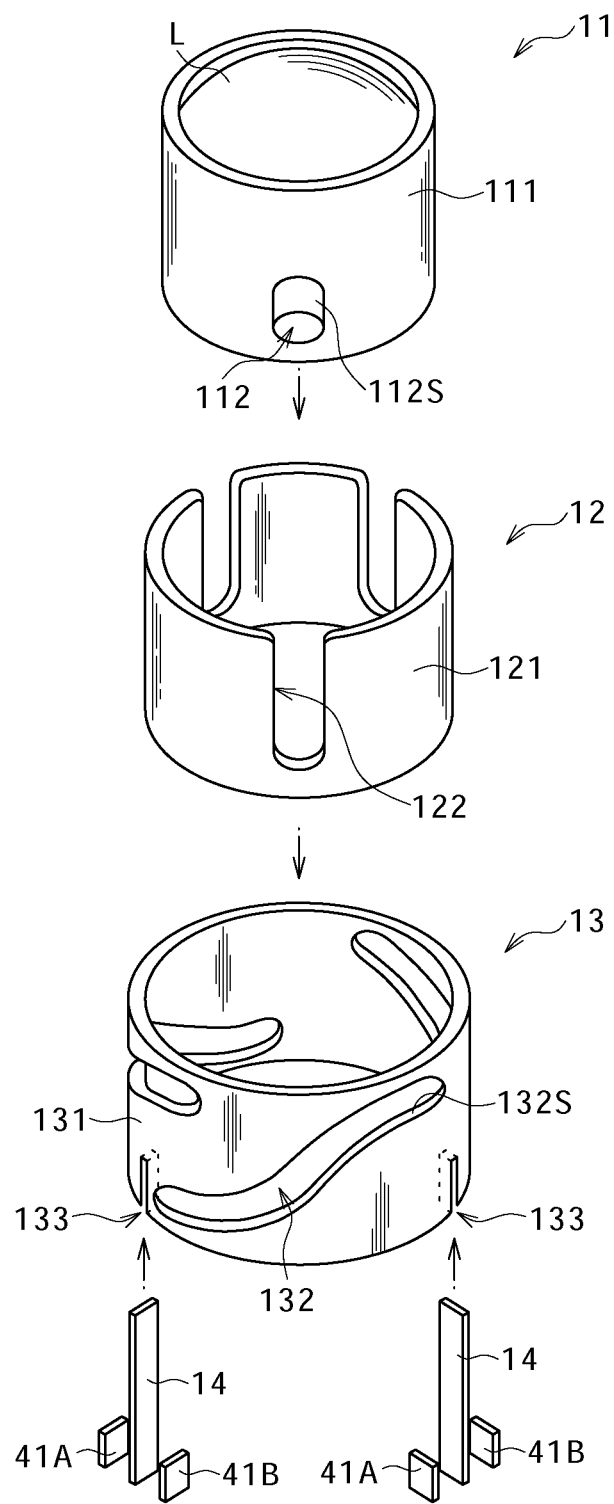
FIG. 3 is an exploded perspective view illustrating the members of the lens mechanism shown in FIG. 1 in exploded fashion.

FIG. 2 is a perspective view illustrating the overall configuration of the lens mechanism 2. FIG. 3 is an exploded perspective view illustrating the members of the lens mechanism 2 in exploded fashion. As illustrated in FIGS. 2 and 3, the lens mechanism 2 includes a lens holding member 11, guide member 12, rotary member 13 and polymer actuator elements 14. The lens holding member 11, guide member 12 and rotary member 13 are arranged in this order from the inside in such a manner that they overlap each other.

The lens holding member 11 holds one or a plurality of lenses L and has, for example, cylindrical protruding portions 112 which are arranged upright on the outer peripheral surface of a cylindrical body portion 111. The lens holding member 11 moves straight along the optical axis Z1 of the lens L during imaging operation. It is preferred that there be a plurality of protruding portions 112 should be provided and that the same portions 112 should be evenly arranged along the circumferential direction of the body portion 111 (direction orbiting the optical axis Z1). The reason for this is that this provides a more reduced inclination relative to the optical axis Z1 when the lens holding member 11 moves straight, thus ensuring a more stable straight motion. It should be noted that the three protruding portions 112 are evenly arranged in FIGS. 1 to 3 so that each sector has a center angle of 120 degrees.

The guide member 12 is fixed to the enclosure 1, for example, via the support substrate 4 and holds the lens holding member 11 in such a manner as to allow for the same member 11 to move straight along the lens optical axis Z1. The guide member 12 has a cylindrical body portion 121 which is disposed in such a manner that the inner peripheral surface of the same portion 121 is opposed to the outer peripheral surface of the body portion 111 of the lens holding member 11. One or a plurality of notches 122 are provided in the body portion 121. The notches 122 extend along the optical axis Z1 and are aligned with the protruding portions 112 of the lens holding member 11. The notches 122 are provided in the same number as the protruding portions 112 of the lens holding member 11 so that each of the notches 122 engages with one of the protruding portions 112. That is, the side surface of each of the protruding portions 112 slides along the extension direction of the notch 122 while remaining in contact with the inner wall surface of the notch 122, thus allowing for the lens holding member 11 to move straight along the optical axis Z1.

The rotary member 13 has one or a plurality of openings 132 provided in a tubular body portion 131. Each of the openings 132 has a cam face 132S. The body portion 131 rotates about the optical axis Z1. The cam face 132S of each of the openings 132 comes in contact with a side surface 112S of one of the protruding portions 112. In the presence of the plurality of openings 132, these openings are evenly arranged along the circumferential direction of the body portion 131 (direction orbiting the optical axis Z1). The openings 132 extend in the circumferential direction of the body portion 131 and vary in position along the optical axis Z1. As a result, the protruding portions 112 in engagement with the openings 132 move along the optical axis Z1 as a result of the rotation of the rotary member 13 on one hand. On the other hand, the same portions 112 are restricted in their movement in directions other than along the optical axis Z1 as a result of the engagement with the notches 122 of the guide member 12. Further, the body portion 131 of the rotary member 13 has one or a plurality of notches 133. Each of the notches 133 cuts through the body portion 131, for example, in the diametric direction and extends from the lower end (rear side edge) to the upper end (front side edge) of the body portion 131 along the optical axis Z1.

Figure 4:
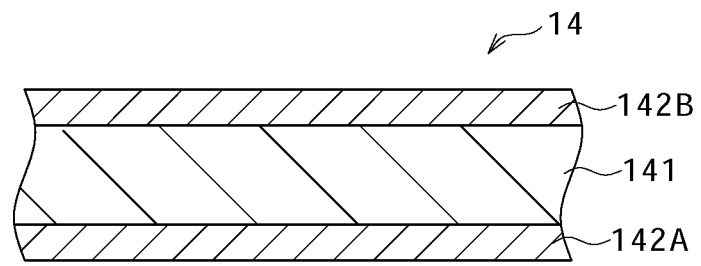
FIG. 4 is an enlarged sectional view of major components illustrating the detailed configuration of a polymer actuator element in the lens mechanism shown in FIG. 1.

Each of the polymer actuator elements 14 includes an ion conductive polymer compound film 141 (hereinafter simply referred to as the polymer compound film 141) and a pair of electrode films 142A and 142B, with each of the electrode films 142A and 142B bonded to one side of the polymer compound film 141. FIG. 4 illustrates the detailed configuration of major components of the polymer actuator element 14. The same element 14 functions in such a manner as to rotate the rotary member 13 in a plane orthogonal to the optical axis Z1 thanks to the deformation (bending) of the polymer compound film 141. The same element 14 is, for example, strip-shaped and has one longitudinal end sandwiched between a pair of electrodes 41A and 41B and fixed to the support substrate 4. The electrodes 41A and 41B are arranged upright on the support substrate 4. On the other hand, the same element 14 has the other longitudinal end in engagement with one of the notches 133 formed in the body portion 131 of the rotary member 13. The electrodes 41A and 41B are each made, for example, of a thin copper plate, with the electrode 41A bonded, for example, to the electrode film 142A and the electrode 41B bonded, for example, to the electrode film 142B. Further, the electrodes 41A and 41B are each connected to a drive circuit (not shown) formed on the circuit substrate 5 by means of an unshown wiring so that a given voltage is applied between the pair of electrode films 142A and 142B. The polymer compound film 141 bends when a given potential difference develops between the electrode films 142A and 142B. The polymer actuator element 14 and electrodes 41A and 41B may be covered with an insulting protective film having high elasticity (such as polyurethane, for example).

The polymer compound film 141 is impregnated with a cationic substance. Here, the term "cationic substance" refers to a substance containing cations and a polar solvent or that containing cations in liquid form. Among substances containing cations and a polar solvent are those in which cations are solvated by a polar solvent. On the other hand, among cations in liquid form are those cations making up an ionic liquid. Among substances containing cations in liquid form are ionic liquids.

Among materials making up the polymer compound film 141 are ion exchange resins having a fluorine resin or hydrocarbon-based resin as a skeleton. Among these ion exchange resins are anionic, cationic and anionic-cationic exchange resins. Of these types of exchange resins, cationic exchange resins are preferred.

Among cationic exchange resins are those into which an acid group such as sulfonic acid group or carboxyl group is introduced. More specifically, cationic exchange resins include polyethylene having an acid group, polystyrene having an acid group or fluorine resin having an acid group. Of these, fluorine resin having a sulfonic acid group or carboxylic acid group is preferred. Above all, Nafion (made by DuPont Kabushiki Kaisha) is preferred.

It is preferred that a cationic substance impregnated in the polymer compound film 141 should be a substance containing metal ions and water, a substance containing organic cations and water or an ionic liquid. Among metal ions are light metal ions such as sodium ion (Na+), potassium ion (K+), lithium ion (Li+) and magnesium ion (Mg2+). On the other hand, among organic cations is alkyl ammonium ion. These cations exist as a hydrate in the polymer compound film 141. Therefore, if the ion conductive polymer compound film 141 is impregnated with a cationic substance containing cations and water, it is preferred that the polymer actuator element 14 should be sealed as a whole to suppress water evaporation.

An ionic liquid is also called a room temperature molten salt and contains cations and anions that are low in combustibility and volatility. In an ionic liquid, the cations making up the ionic liquid are larger in ionic radius than the anions. Among ionic liquids are imidazolium ring-based compounds, pyridinium ring-based compounds and aliphatic compounds.

Above all, it is preferred that the cationic substance should be an ionic liquid. The reason for this is that the polymer actuator element 14 functions properly under a high-temperature environment or vacuum thanks to the low volatility of the ionic liquid.

The electrode films 142A and 142B opposed to each other with the polymer compound film 141 provided therebetween each contain one or two or more different conductive materials. It is preferred that the electrode films 142A and 142B should be made of a conductive material powder bound together by a conductive polymer because this provides the electrode films 142A and 142B with improved flexibility. It is preferred that the conductive material powder should be a carbon powder because a carbon powder provides a large deformation thanks to its high conductivity and large specific surface area. It is preferred that Ketjen Black should be used as a carbon powder. On the other hand, it is preferred that the same material as that making up the polymer compound film 141 should be used as a conductive polymer.

The electrode films 142A and 142B are formed, for example, as described below. That is, a paint prepared by dispersing a conductive material powder and conductive polymer in a dispersion medium is applied to both sides of the polymer compound film 141, which is then allowed to dry. Alternatively, a film containing a conductive material powder and conductive polymer may be crimped onto each side of the polymer compound film 141.

The electrode films 142A and 142B may be multi-layered. In this case, it is preferred that the layers, one made of a conductive material powder bound together by a conductive polymer and another being a metal layer, should be stacked in this order from the side facing the polymer compound film 141. The reason for this is that this provides a more uniform potential in the in-plane direction of the electrode films 142A and 142B, thus contributing to better deformation performance. Among materials making up the metal layer are gold and platinum. Although the thickness of the metal layer is arbitrary, it is preferred that the metal layer should be continuous to provide a uniform potential in the electrode films 142A and 142B. Among methods used to form the metal layer are plating, vapor deposition and sputtering.

It should be noted that if a cationic substance containing cations and a polar solvent is used in the polymer actuator element 14, the polymer compound film 141 contains almost no anions.

The size (width and length) of the polymer compound film 141 can be set as desired according, for example, to the size (outer and inner diameters) and weight of the rotary member 13 or required displacement of the polymer compound film 141. The displacement of the polymer compound film 141 is set according to the required amount of travel of the lens holding member 11 along the optical axis Z1, namely, the movable range (magnitude of the rotation angle) of the rotary member 13.

[Operation of the Polymer Actuator Element]

Figure 5A:
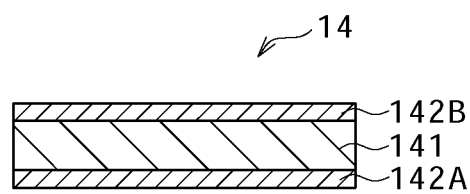
FIGS. 5A and 5B are sectional schematic diagrams for describing the operation of the polymer actuator element.
Figure 5B:
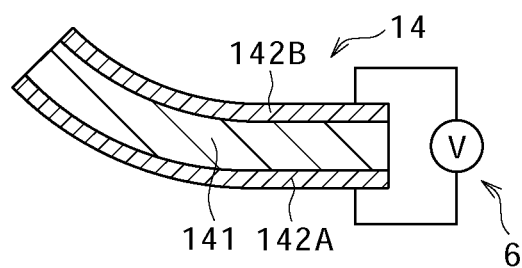

Here, a description will be given below of the operating principle of the polymer actuator element 14 with reference to FIGS. 5A and 5B. FIG. 5A illustrates a sectional configuration of the polymer actuator element 14 when no drive voltage is applied between the electrode films 142A and 142B (voltage-free condition). On the other hand, FIG. 5B illustrates a sectional configuration of the polymer actuator element 14 when a drive voltage is applied between the electrode films 142A and 142B (voltage-applied condition).

A description will be given first of a case in which a cationic substance containing cations and a polar solvent is used.

In this case, the cationic substance is more or less evenly distributed in the polymer compound film 141 when no voltage is applied to the polymer actuator element 14. As a result, the same element 14 does not bend, but instead, remains flat (FIG. 5A). Here, when applied with a voltage by a voltage application block 6, the polymer actuator element 14 behaves in the following manner. That is, when a given drive voltage is applied between the electrode films 142A and 142B, for example, so that the electrode film 142A assumes a negative potential and the electrode films 142B a positive potential, the cations migrate toward the electrode film 142A while being solvated with the polar solvent. At this time, the polymer compound film 141 contains almost no anions. In the same film 141, therefore, the electrode film 142A swells while the electrode film 142B shrinks. This causes the polymer actuator element 14 as a whole to bend toward the electrode film 142B as illustrated in FIG. 5B. Then, when the potential difference is removed between the electrode films 142A and 142B so that no voltage is applied therebetween, the cationic substance (cations and polar solvent), that was unevenly distributed toward the electrode film 142A in the polymer compound film 141, is dispersed, restoring the same film 141 to its original form as illustrated in FIG. 5A. On the other hand, when a given drive voltage is applied between the electrode films 142A and 142B with the polymer compound film 141 in a voltage-free condition as illustrated in FIG. 5A, for example, so that the electrode film 142A assumes a positive potential and the electrode films 142B a negative potential, the cations migrate toward the electrode film 142B while being solvated with the polar solvent. In this case, in the polymer compound film 141, the electrode film 142A shrinks while the electrode film 142B swells. This causes the polymer actuator element 14 as a whole to bend toward the electrode film 142A.

A description will be given next of a case in which an ionic liquid containing cations in liquid form is used as a cationic substance. In this case, when no voltage is applied to the polymer actuator element 14, the same element 14 also remains flat as illustrated in FIG. 5A because the ionic liquid is more or less evenly distributed in the polymer compound film 141. Here, when applied with a voltage by the voltage application block 6, the polymer actuator element 14 behaves in the following manner. That is, when a given drive voltage is applied between the electrode films 142A and 142B, for example, so that the electrode film 142A assumes a negative potential and the electrode films 142B a positive potential, the cations in the ionic liquid migrate toward the electrode film 142A, and the anions toward the electrode film 142B. Here, the cations making up the ionic liquid are larger in ionic radius than the anions. In the polymer compound film 141, therefore, the electrode film 142A swells while the electrode film 142B shrinks. This causes the polymer actuator element 14 as a whole to bend toward the electrode film 142B as illustrated in FIG. 5B. Then, when the potential difference is removed between the electrode films 142A and 142B so that no voltage is applied therebetween, the cations that were unevenly distributed toward the electrode film 142A in the polymer compound film 141 are dispersed, restoring the same film 141 to its original form as illustrated in FIG. 5A. On the other hand, when a given drive voltage is applied between the electrode films 142A and 142B with the polymer compound film 141 in a voltage-free condition as illustrated in FIG. 5A, for example, so that the electrode film 142A assumes a positive potential and the electrode films 142B a negative potential, the cations in the ionic liquid migrate toward the electrode film 142B, and the anions toward the electrode film 142A. In this case, in the polymer compound film 141, the electrode film 142A shrinks while the electrode film 142B swells. This causes the polymer actuator element 14 as a whole to bend toward the electrode film 142A.

Operation of the Imaging Device

In the present imaging device, the polymer actuator elements 14 are driven by the drive circuit formed on the circuit substrate 5, thus applying a driving force to the rotary member 13 in a direction perpendicular to the optical axis Z1. As a result of the rotation of the rotary member 13 about the optical axis Z1 by this driving force, the spacing between the lens L and imaging element 3 changes. For example, when the polymer actuator elements 14 are bent toward the electrode 41B (toward the electrode film 142B) as illustrated in FIG. 6A so that the rotary member 13 rotates counterclockwise as seen from the object side, the protruding portions 112 move along the optical axis Z1 through the openings 132 toward the image side. The protruding portions 112 form the lens holding member 11 integrally with the body portion 111 adapted to hold the lens L. Naturally, therefore, the lens holding member 11 moves toward the image side relative to the guide member 12 and rotary member 13. The guide member 12 and rotary member 13 are unchanged in position along the optical axis Z1 relative to the imaging element 3 fixed to the support substrate 4. As a result, the lens holding member 11 moves toward the image side relative to the imaging element 3. At this time, the side surface of each of the protruding portions 112 is in contact with the inner wall surface of the notch 122, thus causing the same member 11 to move straight along the optical axis Z1 without rotating.

In contrast, when the polymer compound films 141 are bent toward the electrode 41A (toward the electrode film 142A) as illustrated in FIG. 6B so that the rotary member 13 rotates clockwise as seen from the object side, the protruding portions 112 move along the optical axis Z1 through the openings 132 toward the object side. As a result, the lens holding member 11 moves toward the object side relative to the imaging element 3. In this case, the same member 11 also moves straight along the optical axis Z1 without rotating.

As described above, in the imaging device according to the present embodiment, the polymer actuator elements 14 of the lens mechanism 2 apply a driving force to the rotary member 13 in a direction perpendicular to the optical axis Z1. This makes it possible to move the lens holding member 11 with high accuracy to a given position along the optical axis Z1 irrespective of the attitude of the lens mechanism 2, thus allowing for more accurate focusing and zooming and delivering excellent optical performance. Further, the lens holding member 11 is held by the guide member 12, thus allowing it to move straight along the optical axis Z1 without rotating. This prevents the aberration change resulting from the rotation of the lens L, thus allowing for relatively easy aberration correction.

Still further, the guide member 12 and rotary member 13 respectively have the tubular body portions 121 and 131 both of which have their centers at the optical axis Z1. The body portions 121 and 131 are disposed so that the lens holding member 11 is surrounded by the body portion 121, which is, in turn, surrounded by the body portion 131. This arrangement prevents the lens mechanism 2 from expanding (taking up more area) in the plane perpendicular to the optical axis Z1, thus providing a more compact overall design of the lens mechanism 2.

Although the present application has been described above by referring to a preferred embodiment, the present application is not limited to the embodiment, but may be modified in various manners. For example, in the above embodiment, the protruding portions are provided on the outer surface of the lens holding member, on the outside of which two members, namely, the guide member having notches adapted to engage with the protruding portions and the rotary member having cam faces adapted to come in contact with the protruding portions, are arranged in this order. However, the present application may have other embodiments.

Further, although a case was described in the above embodiment in which the polymer actuator elements were rectangular in shape, the same elements are not limited thereto in shape. For example, the same elements may be oval, triangular or polygonal. Still further, the polymer actuator elements may be changed in position or orientation relative to the rotary member as appropriate. In this case, if the polymer actuator elements are disposed so that their longitudinal direction is orthogonal to the rotation direction of the rotary member, the rotatable range of the rotary member can be expanded. Still further, although the plurality of polymer actuator elements were provided in the above embodiment, it is only necessary to provide at least one polymer actuator element.

On the other hand, the shapes, positions and number of the openings having a cam face provided on the rotary member are not limited to those in the above embodiment either, but may be changed as appropriate.

It should be understood that various changes and modifications to the presently preferred embodiments described herein will be apparent to those skilled in the art. Such changes and modifications can be made without departing from the spirit and scope and without diminishing its intended The application is claimed as follows:

1. A lens mechanism, comprising:
   a base;
   a guide member fixed to the base;
   a lens holding member adapted to hold the lens and which is held by the guide member in such a manner as to move straight along an optical axis;
   a rotary member adapted to rotate while at the same time engaging with part of the lens holding member so as to cause the lens holding member to move straight along the optical axis, said rotary member including a plurality of notches; and
   a plurality of polymer actuator elements, each of said polymer actuator elements connected to a drive circuit formed on a circuit substrate with wiring, and each of said polymer actuator elements having one end fixed to the base or guide member and the other end engaging in one of the notches of the rotary member,
   wherein a portion of each of the polymer actuator elements are deformed in either a clockwise or counterclockwise direction around the optical axis so as to rotate the rotary member in a plane orthogonal to the optical axis when voltage is applied from the drive circuit.

2. The lens mechanism of claim 1, wherein
   each of the polymer actuator elements includes an ion conductive polymer compound film containing a cationic substance sandwiched between a pair of electrodes.

3. The lens mechanism of claim 1, wherein
   the lens holding member has protruding portions on its outer surface, and
   the rotary member has cam faces each of which comes in contact with one of the protruding portions.

4. The lens mechanism of claim 3, wherein
   the guide member has notches each of which engages with one of the protruding portions of the lens holding member and extends along the optical axis.

5. The lens mechanism of claim 1, wherein
   the rotary member is a tubular member adapted to rotate about the optical axis.

6. An imaging device, comprising:
   an enclosure, and
   a lens mechanism including:
      a base;
      a guide member fixed to the base;
      a lens holding member adapted to hold the lens and which is held by the guide member in such a manner as to move straight along an optical axis;
      a rotary member adapted to rotate while at the same time engaging with part of the lens holding member so as to cause the lens holding member to move straight along the optical axis, said rotary member including a plurality of notches; and
   a plurality of polymer actuator elements, each of said polymer actuator elements connected to a drive circuit formed on a circuit substrate with wiring, and each of said polymer actuator elements having one end fixed to the base or guide member and the other end engaging in one of the notches of the rotary member,
   wherein a portion of each of the polymer actuator elements are deformed in either a clockwise or counterclockwise direction around the optical axis so as to rotate the rotary member in a plane orthogonal to the optical axis when voltage is applied from the drive circuit.

* * * * *